United States Patent [19]
Rossini

[11] Patent Number: 5,083,835
[45] Date of Patent: Jan. 28, 1992

[54] OVER-MOULDED FRAME FOR ENCAPSULATING MOTOR VEHICLE WINDOWS

[75] Inventor: Lorenzo R. Rossini, Milan, Italy

[73] Assignee: Alfa Lancia S.p.A., Arese, Italy

[21] Appl. No.: 712,096

[22] Filed: Jun. 7, 1991

[30] Foreign Application Priority Data

Jun. 8, 1990 [IT]  Italy ................. 20588 A/90

[51] Int. Cl.⁵ .................................................. B60J 1/00
[52] U.S. Cl. .................................. 296/201; 296/93; 52/208
[58] Field of Search ............... 296/201, 93; 52/208, 52/400

[56] References Cited

U.S. PATENT DOCUMENTS

| | | | |
|---|---|---|---|
| 4,072,340 | 2/1978 | Morgan | 296/201 |
| 4,387,923 | 6/1983 | Choby et al. | 296/201 |
| 4,591,203 | 5/1986 | Furman | 296/201 |
| 4,712,341 | 12/1987 | Harris et al. | 52/208 |
| 5,027,569 | 7/1991 | Keys | 52/208 |

FOREIGN PATENT DOCUMENTS

76924  9/1982  European Pat. Off. .
145354 11/1984  European Pat. Off. .

*Primary Examiner*—Robert R. Song
*Attorney, Agent, or Firm*—Longacre & White

[57] ABSTRACT

An over-moulded frame for encapsulating motor vehicle windows in which in a plastics element over-moulded onto the edge of a window there is embedded a metal stiffening and support structure for the window edge and for a seal gasket for adjacent windows.

9 Claims, 1 Drawing Sheet

OVER-MOULDED FRAME FOR ENCAPSULATING MOTOR VEHICLE WINDOWS

This invention relates to an over-moulded frame for encapsulating motor vehicle windows.

Various systems for encapsulating vehicle windows by over-moulding frames of suitable cross-section are known. The over-moulding is done by processes involving the injection or injection-reaction of plastics or elastomer materials such as PVC, polyurethane and EPDM.

The advantages of this encapsulation are mainly that any imperfections in the edge of the glass are masked, precise dimensions for the glass pulse frame (ie the mold dimensions) are obtained, the glass can be handled without having to be ground, the corners of the glass are protected, and the frame does not become detached, which means that totally plate glass surfaces with very shallow almost flush and therefore practically irrelevant edge frames can be arranged side by side.

If the encapsulated windows seal against gaskets (for example if mobile), an opposing structure normally has to be provided comprising a flange or suitable systems for fixing the gaskets, ie the glass does not carry the seal gasket, which is in fact fixed to the body against which the glass adheres, to form a seal.

The object of this invention is to provide an over-moulded frame for encapsulating vehicle windows which is able to directly seal against adjacent windows, so eliminating the need for support structures for the seal gaskets and consequently minimizing optical interference between windows, with resultant maximum visibility.

This object is attained by an over-moulded frame for encapsulating vehicle windows, consisting of a plastics element over-moulded onto the edge of a vehicle window in such a manner as to embrace said edge by having an essentially U-shaped cross-section, characterized in that said plastics element comprises embedded in its interior a metal stiffening structure having a substantially U-shaped main section arranged in the same direction as said cross-section of said plastics element, from said main section there extending at least one appendix able to securely receive and support a gasket arranged to provide a seal against an adjacent window.

In particular, said metal stiffening structure is provided with a plurality of gripping teeth situated within said main section and in contact with said edge of said window. In a preferred embodiment of the present invention said plastics element has a jutting curved profile able to collect and dispose of water. Again according to the present invention, said gasket arranged to provide a seal against an adjacent window is an extruded gasket having a sealing bulb and carrying laterally a body provided with a seat to receive and engage said at least one appendix extending from said metal stiffening structure.

More specifically, said bulb of said extruded gasket has a substantially annular hollow cross-section. In one embodiment of this invention said body positioned laterally to and fixed to said sealing bulb is provided with a seat of U cross-section.

In a further embodiment of the invention said body positioned laterally to said sealing bulb is provided with a contact tooth close to an end portion of said plastics element. Again according to the invention said at least one appendix is a continuous strip element formed integrally with said metal stiffening structure and arranged perpendicular to said main U-shaped section in proximity to one end of its arms.

The characteristics and further advantages of the present invention will be more apparent from the following description given by way of non-limiting example with reference to the accompanying drawing in which.

Figure 1:
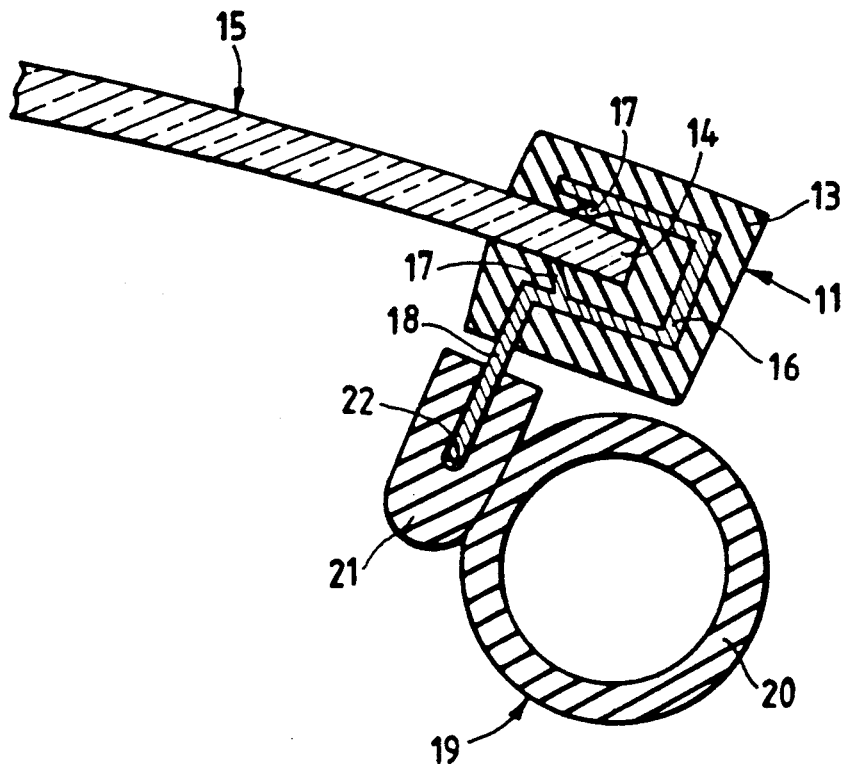
FIG. 1 is a section through a frame according to the invention.

In the figures the reference numerals 11 and 111 indicate overall two frames constructed in accordance with the present invention. The frame 11 comprises a plastics element 13 over-moulded on an edge 14 of a window 15 for a vehicle (not shown). The element 13 has essentially a U-shaped cross-section and contains a metal structure 16 embedded in its interior.

The structure 16, which also has a main U-shaped cross-section arranged in the same direction as the cross-section of the element 13, is provided with teeth 17 for securely gripping the frame at the edge 14 of the glass, and with an appendix 18 which extends perpendicularly to the arms of the main cross-section. The appendix 18 is basically a continuous strip element formed for example by bending, and is consequently integral with the structure 16.

To complete the assembly of the frame, there is mounted on the appendix 18 a seal gasket 10 consisting of a sealing bulb 20 and a body 21 positioned laterally to the bulb.

Figure 2:
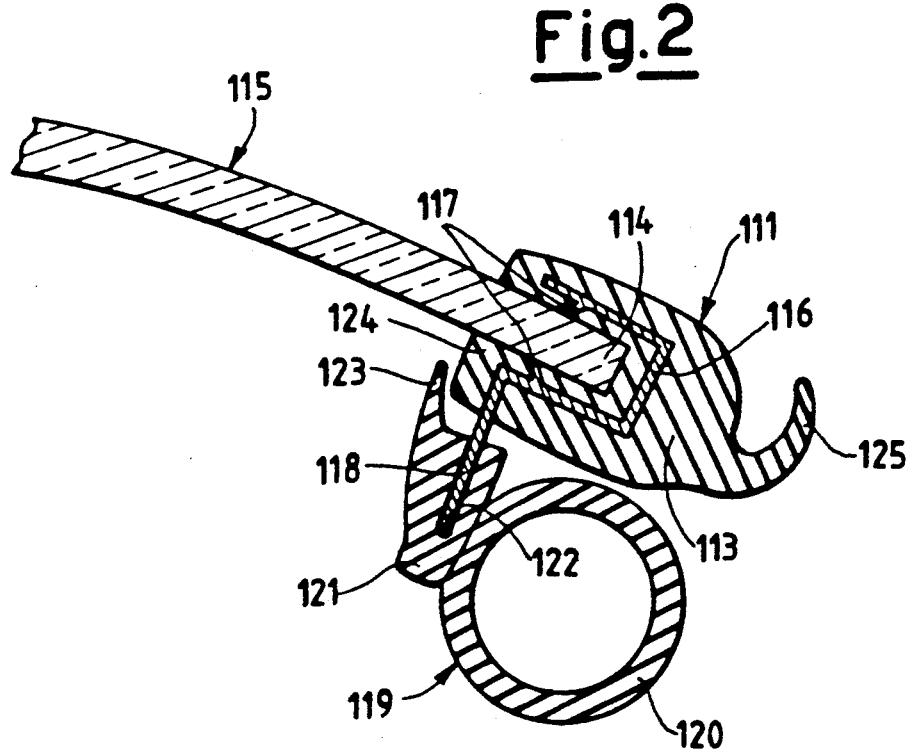
FIG. 2 is a section through a further embodiment of a frame according to the invention.

The bulb 20 and body 21 are generally of different rigidity, the body 21 also being provided with a seat 22 of U cross-section having a size such as to be able to securely fix the seal gasket 19 to the appendix 18. A further embodiment of the frame is shown in FIG. 2 and, as stated, is indicated by the reference numeral 111. As in the case of the aforegoing description it comprises a plastics element 113 over-moulded onto an edge 114 of a window 115. A metal structure 116 provided with teeth 117 is embedded in the plastics element and is provided with an appendix 118 on which a seal gasket 119 is mounted.

The gasket 119 consists of a bulb 120 with which there is laterally rigid a body 121 provided with a seat 122 able to securely receive the appendix 118 and with a contact tooth 123 close to an end portion 124 of the plastics element 113. In this embodiment of the frame according to the invention, on the plastics element 113 there is also provided a curved jutting profile 125 able to receive and disposed of water.

In the case of an automobile without a front upright, the windowscreen could be provided with a frame according to the invention, to thus provide the seal gasket for the total-visibility windows of the doors.

Likewise in a two-door automobile in which the central upright is lacking and the rear window is fixed, the frame of the invention can be formed on this latter to thus again provide the seal gasket for the door windows.

The frame of the invention can be advantageously used in windscreen/roof structure formed in one piece (for example of plate glass) in which the seals could be provided by the frame gasket given the absence of uprights.

I claim:

1. An over-moulded frame for encapsulating vehicle windows, consisting of a plastics element over-moulded onto the edge of a vehicle window in such a manner as the embrace said edge by having an essentially U-shaped cross-section, characterized in that said plastics element comprises embedded in its interior a metal stiffening structure having a substantially U-shaped main section arranged in the same direction as said cross-section of said plastics element, from said main section there extending at least one appendix able to securely receive and support a gasket arranged to provide a seal against an adjacent window.

2. A frame as claimed in claim 1, characterized in that said metal stiffening structure is provided with a plurality of gripping teeth situated within said main section and in contact with said edge of said window.

3. A frame as claimed in claim 1, characterized in that said plastics element has a jutting curved profile able to collect and dispose of water.

4. A frame as claimed in claim 1, characterized in that said gasket arranged to provide a seal against an adjacent window is an extruded gasket having a sealing bulb and carrying laterally a body provided with a seat to receives and engage said at least one appendix extending from said metal stiffening structure.

5. A frame as claimed in claim 4, characterized in that said bulb of said extruded gasket has a substantially annular hollow cross section.

6. A frame as claimed in claim 4, characterized in that said body positioned laterally to and fixed to said sealing bulb is provided with a seat of U cross-section.

7. A frame as claimed in claim 4, characterized in that said body positioned laterally to said sealing bulb is provided with a contact tooth close to an end portion of said plastics element.

8. A frame as claimed in claim 1, characterized in that said at least one appendix is a continuous strip element formed integrally with said metal stiffening structure.

9. A frame as claimed in claim 1, characterized in that said at least one appendix is arranged perpendicular to said main U-shaped section in proximity to one end of its arms.

* * * * *